(No Model.)
L. F. PARKS.
COMBINATION WOODWORKING MACHINE.
No. 548,220. Patented Oct. 22, 1895.
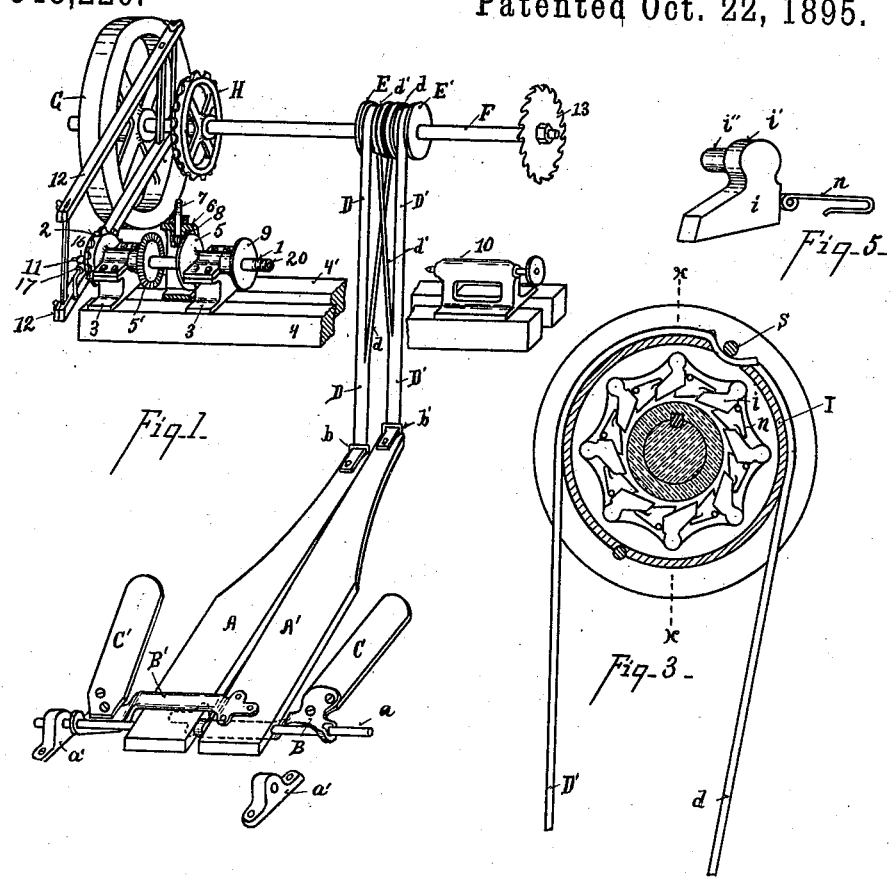
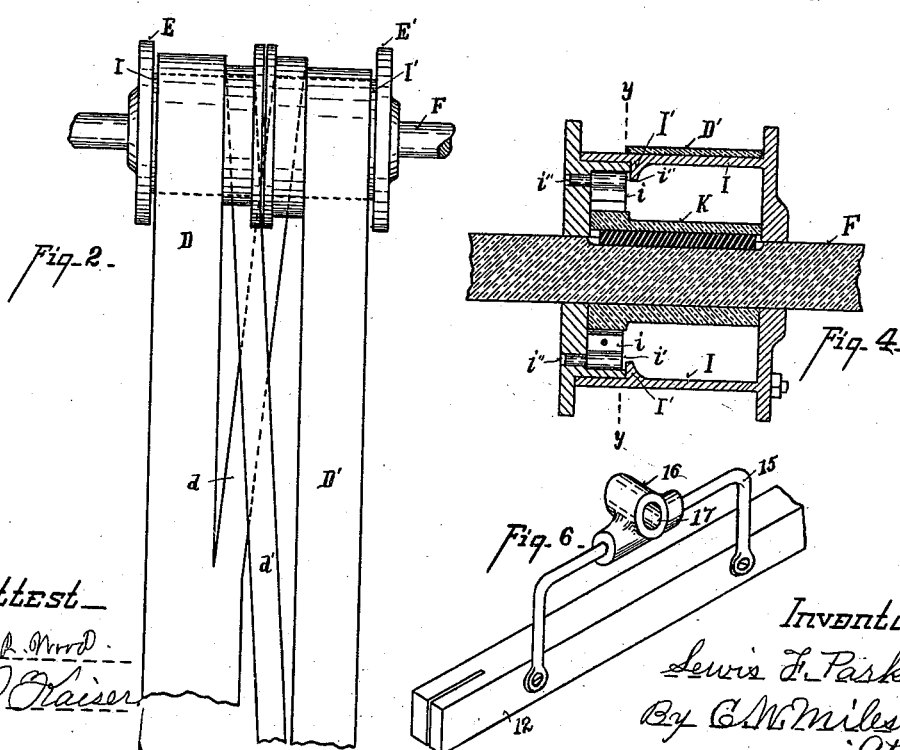
Attest—
Inventor—
Lewis F. Parks
By C. W. Miles
Atty.

UNITED STATES PATENT OFFICE.

LEWIS F. PARKS, OF CINCINNATI, OHIO.

COMBINATION WOODWORKING-MACHINE.

SPECIFICATION forming part of Letters Patent No. 548,220, dated October 22, 1895.

Application filed November 29, 1893. Serial No. 492,339. (No model.)

*To all whom it may concern:*

Be it known that I, LEWIS F. PARKS, a citizen of the United States, residing at Cincinnati, in the county of Hamilton and State of Ohio, have invented certain new and useful Improvements in Combination Woodworking-Machines, of which the following is a specification.

My invention relates to improvements in combination woodworking-machines. Its object is to provide a convenient and economical combination of woodworking devices and improved means for driving the same, which will be more fully described in connection with the accompanying drawings, forming part of this specification, and in which—

Figure 1 is a perspective view of my device in position for use, with the tables and framework omitted to show the operative parts. Fig. 2 is an enlarged detail view of a portion of the driving mechanism, showing the manner of arranging the belts. Fig. 3 is a cross-section through one of the driving ratchet-wheels on line $y\ y$, Fig. 4. Fig. 4 is a longitudinal section through the same on line $x\ x$, Fig. 3. Fig. 5 is a detail view of one of the driving-pawls. Fig. 6 is a detail view of the mechanism for reciprocating the scroll-saw.

1 represents the operative mandrel or shaft of the machine, which is driven from the main shaft F by means of a chain belt passing from sprocket-wheel H on the main shaft to sprocket-wheel 2 on shaft 1. Shaft 1 is mounted in bearings 3 on ways 4 4'.

5 5' represent beveled gears secured to shaft 1 between bearings 3.

6 represents a yoke mounted on ways 4 4' and provided with bearings for the upright spindle 7, which is driven by beveled gear 8, which meshes with either gear 5 or gear 5', according to the direction in which it is desired to drive spindle 7. The spindle 7 is provided with revolving bits and used for frizzing and other similar purposes.

The forward end of shaft 1 is provided with a flanged hub 9, and its projecting end is screw-threaded and provided with a tapered socket 20, in order to adapt it to receive small circular saws, revolving cutter-heads, and different styles of lathe-chucks.

10 represents a lathe tail-piece which is adjustable on the ways 4 4'.

From the outer face of the wheel 2 projects a crank-pin 11, which may be brought into or out of engagement with the lower bar of a scroll-saw 12. In Fig. 6 is illustrated the manner of connecting the saw-bar to the crank-pin 11.

15 represents a wire stirrup secured to the saw-bar.

16 represents a journal-box, preferably of Babbitt metal, cast upon the stirrup and subsequently loosened so as to reciprocate backward and forward upon the stirrup.

17 represents the bearing for the crank-pin 11.

13 represents a heavy or rip saw mounted upon the end of shaft F.

The parts above mentioned are preferably driven in the following manner: The treadles A A' are swiveled upon a rod $a$, mounted in brackets $a'$, which are secured to the floor. B B' represent cast yokes secured at one end to one of the treadles and passing over the other treadle and journaling on rod $a$. C C' represent supplemental treadle-blades secured to yokes B B'. To the forward end of the treadles A A' are secured by suitable clips $b\ b'$ belts D D', the opposite ends of which are secured to the faces of ratchet-wheels E E'. F represents the main shaft from which power is transmitted to the operative parts of the machine. The shaft F is preferably provided with a balance-wheel G and suitable transmitting-pulley H. The ratchet-wheels E E' are placed in close proximity to each other and are in form each the counterpart of the other.

In Figs. 3, 4, and 5 the construction of the ratchet-wheels is illustrated.

I represents a hollow drum journaling loosely on the shaft at opposite ends and carrying a set of pawls $i$.

K represents a hub, splined or otherwise secured to the shaft F, and provided with ratchet-teeth $l$, with which the pawls $i$ engage. The hub K is inclosed within the hollow drum I. The pawls $i$ are provided with offsets or lugs $i''$, concentric with the curved bearing-faces $i'$, which rest loosely in recesses in one of the heads of drum I and are held against displacement by flange I' on the inside of drum I.

$n$ represents spring-arms projecting from the rear face of the pawls and resting upon the forward face of the succeeding pawl. The action of this spring is twofold. It holds the tooth of one pawl in engagement with the face of the ratchet, and also holds the bearing-face $i'$ of the other pawl in place in the recess in drum I, thus insuring the operation of the pawls and preventing any slip between the pawls and drum I.

The drums I are reciprocated by means of the treadles to drive the shaft F in the following manner: The belts D D' are split longitudinally through a portion of their length into two belts D $d$ and D' $d'$, the portions D D' being the broad or driving portions, while the portions $d$ $d'$ are narrow and are used only to return the drums I and treadles A to the raised position previous to being again depressed. As illustrated, the belts are secured to the ratchet-wheels in the following manner: The end of belt D is secured or clipped, as at $s$, Fig. 3, to the outer face of drum I, passing over the drum in such manner as to be coiled upon the drum as the treadle A is raised and uncoiled by depressing the treadle. The belt $d$ passes over the inner portion of the face of the opposite or right-hand drum and in the opposite direction to that in which belt D passes over its drum. Belt D' is in like manner secured to the face of the right-hand drum and belt $d'$ to the face of the left-hand drum. It will thus be seen that as treadle A is depressed it uncoils belt D from the face of the left-hand drum, rotating the drum and shaft F. It also, by uncoiling belt $d$ from the right-hand drum I, drives it in a backward or reverse direction, which coils the belt D' upon the right-hand drum I and raises treadle A', the belt $d'$ being at the same time coiled upon left-hand drum I. The treadle A' is then depressed, driving shaft F and raising treadle A, whereby a continuous and steady revolution of shaft F is effected.

It is obvious that cords, wire cables, or other similar materials could be substituted for the belts D D' $d$ $d'$.

Having described my invention, what I claim is—

1. In a combination wood working machine the combination of a mandrel provided at its forward end with a flanged hub, a screw threaded shank and taper socket, to adapt it to be used as a lathe mandrel, the gears 5 5' mounted between the journals of said mandrel, an upright spindle 7 carrying suitable cutter heads, mounted above said mandrel and adapted to be driven alternately in opposite directions by means of said beveled gears, substantially as specified.

2. In a combination wood working machine the combination of mandrel 1 provided at its forward end with a flanged hub, and screw threaded shank, to adapt it to be used as a lathe mandrel, and to receive other revolving tools, a yoke piece 6 spanning said mandrel near its center, an upright spindle 7 mounted therein and gears 5 5' and 8 for driving said spindle substantially as specified.

3. In a combination wood working machine, a main shaft F carrying a circular saw, and elevated so as to bring the saw into operation at or above the lathe ways, a lathe mandrel driven from said main shaft, and provided with a flanged collar and screw threaded shank to adapt it to receive a variety of tools, upright frizzer spindle 7 mounted above said mandrel and suitable gears to drive it therefrom, substantially as specified.

4. In a combination wood working machine the combination of mandrel 1 provided at its forward end with a flanged collar, screw threaded shank and tapered socket, and at its rear end with crank 11 for driving a scroll saw or other tool, gears 5, 5', mounted on said mandrel between its journals, and an upright frizzer spindle 7, mounted above said mandrel and adapted to be driven therefrom, substantially as specified.

5. In a combination wood working machine, the combination with a reciprocating scroll saw of the stirrup 15, reciprocating cross head 16, cast thereon, and provided with journal bearing 17, a mandrel 1 and crank pin 11 for reciprocating said saw, substantially as specified.

6. In a combination wood working machine in combination with the main shaft F and mandrel 1, ratchet wheels E, E', belts $d, d'$, D, D', main treadles A, A', pivoted yoke pieces B, B', and a series of supplemental treadles C secured to said yoke pieces substantially as specified.

In testimony whereof I have hereunto set my hand.

LEWIS F. PARKS.

Witnesses:
OLIVER KAISER,
C. W. MILES.